United States Patent
Ogawa

(10) Patent No.: US 11,941,975 B2
(45) Date of Patent: Mar. 26, 2024

(54) DRIVING ASSISTANCE SYSTEM, ONBOARD DEVICE, METHOD, AND COMPUTER PROGRAM

(71) Applicant: SUMITOMO ELECTRIC INDUSTRIES, LTD., Osaka (JP)

(72) Inventor: Akihiro Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 874 days.

(21) Appl. No.: 16/975,885

(22) PCT Filed: Mar. 14, 2019

(86) PCT No.: PCT/JP2019/010559
§ 371 (c)(1),
(2) Date: Aug. 26, 2020

(87) PCT Pub. No.: WO2019/188343
PCT Pub. Date: Oct. 3, 2019

(65) Prior Publication Data
US 2021/0005080 A1 Jan. 7, 2021

(30) Foreign Application Priority Data
Mar. 28, 2018 (JP) .................................. 2018-062358

(51) Int. Cl.
*G08G 1/01* (2006.01)
*H04W 4/38* (2018.01)
*H04W 24/08* (2009.01)

(52) U.S. Cl.
CPC ......... *G08G 1/0112* (2013.01); *G08G 1/0141* (2013.01); *H04W 4/38* (2018.02); *H04W 24/08* (2013.01)

(58) Field of Classification Search
CPC ...... G01G 1/01; G01G 1/0112; G01G 1/0141; G01G 1/09; H04W 4/38; H04W 4/44;
(Continued)

(56) References Cited

U.S. PATENT DOCUMENTS 10,145,945 B2 * 12/2018 Harada ................... G01S 17/42
10,285,141 B1 * 5/2019 Carver ................ A61B 5/0015
(Continued)

FOREIGN PATENT DOCUMENTS

| CN | 107852763 A | 3/2018 |
| JP | 2004-247924 A | 9/2004 |

(Continued)

*Primary Examiner* — Andrew Joseph Rudy
(74) *Attorney, Agent, or Firm* — Oliff PLC

(57) ABSTRACT

The system includes a server and an on-vehicle device of a vehicle. The on-vehicle device includes a collecting unit for collecting sensor information detected by a sensor on the vehicle, a transmission unit for transmitting the sensor information collected by the collecting unit, to the server via a communication line, a reception unit for receiving data including a line speed of the communication line in an expected traveling area of the vehicle, from outside of the vehicle, a line management unit for determining, as a predicted line speed, the line speed of the communication line at an expected traveling position of the vehicle in a future, on the basis of the data received by the reception unit, and a control unit for determining a parameter relevant to transmission of the sensor information collected by the collecting unit to the server, on the basis of the predicted line speed.

20 Claims, 13 Drawing Sheets

(58) Field of Classification Search
CPC ....... H04W 24/08; H04W 8/24; H04W 28/20;
G01R 1/067; G01R 31/28; H01P 5/04;
H04L 5/0082; H04L 65/1016
USPC ...................................... 701/117; 324/750.03
See application file for complete search history.

(56) References Cited

U.S. PATENT DOCUMENTS

| | | | |
|---|---|---|---|
| 10,497,263 B2* | 12/2019 | Oh ...................... | B60W 30/095 |
| 11,069,235 B2* | 7/2021 | Kume .................... | G08G 1/162 |
| 11,248,925 B2* | 2/2022 | Lee .......................... | B60R 1/00 |
| 2010/0190449 A1 | 7/2010 | Suzuki | |
| 2022/0043448 A1* | 2/2022 | Ferguson .............. | B60W 40/06 |

FOREIGN PATENT DOCUMENTS

| | | |
|---|---|---|
| JP | 2008-077143 A | 4/2008 |
| JP | 2008-129815 A | 6/2008 |
| JP | 2008-263580 A | 10/2008 |
| JP | 2010-177945 A | 8/2010 |
| JP | 2012-163461 A | 8/2012 |
| JP | 2016-134816 A | 7/2016 |
| JP | 2016-197842 A | 11/2016 |
| WO | 2017/011039 A1 | 1/2017 |

* cited by examiner

FIG. 7

| LINE SPEED AFTER Δt p[bps] | INDEX | SENSOR INFORMATION COLLECTION SPEED q[fps] | TRANSMISSION BUFFER SIZE r[byte] | SENSOR INFORMATION TRANSMISSION SPEED s[bps] |
|---|---|---|---|---|
| $0 \leq p < P_1$ | 1 | $Q_1$ | $R_1$ | $S_1$ |
| $P_1 \leq p < P_2$ | 2 | $Q_2$ | $R_2$ | $S_2$ |
| ------ | ------ | ------ | ------ | ------ |
| $P_{i-1} \leq p < P_i$ | i | $Q_i$ | $R_i$ | $S_i$ |
| ------ | ------ | ------ | ------ | ------ |
| $P_{N-1} \leq p$ | N | $Q_N$ | $R_N$ | $S_N$ |

DRIVING ASSISTANCE SYSTEM, ONBOARD DEVICE, METHOD, AND COMPUTER PROGRAM

TECHNICAL FIELD

The present disclosure relates to a system, an on-vehicle device, a method, and a computer program for driving support. This application claims priority on Japanese Patent Application No. 2018-62358 filed on Mar. 28, 2018, the entire contents of which are incorporated herein by reference.

BACKGROUND ART

Various types of systems (hereinafter, referred to as driving support system) for supporting a driver in driving of an automobile, a motorcycle, etc. (hereinafter, referred to as vehicle) have been proposed. In the driving support system, information is collected from various sensor devices (camera, radar, etc.) set on a road and therearound, and the information is analyzed to provide traffic-related information (accident, congestion, etc.) to a vehicle. In addition, with increase in speed of a mobile communication line (hereinafter, may be referred to as communication line), it is also proposed to collect information from sensor devices mounted on vehicles, as well as sensor devices provided on a road and therearound, and effectively utilize the information for driving support. For example, a standard of cellular V2X has been proposed from a third generation partnership project (3GPP) which promotes standardization of a 3rd-generation mobile communication system and a mobile communication system following this. V means a vehicle and X means anything other than this. The purpose of this standard is to perform communication between a vehicle and anything other than this by long term evolution (LTE) and 5th-generation mobile communication system (5G). The 5G line can achieve a line speed of 100 to 1000 times the speed of LTE line.

Patent Literature 1 shown below discloses that a probe information collecting device, a probe information transmission device, and a probe information collecting method that can optimize collection for probe information (position information, time information, road surface condition information, etc., collected via a probe vehicle) through control of a center for collecting the probe information. Specifically, a probe information collecting center acquires at least either of communication state information (congestion state) and road traffic information in a probe information collection target area, and on the basis thereof, determines a collection condition for collecting probe information. The probe information collecting center transmits the determined collection condition to a probe vehicle and receives probe information matching the collection condition.

Patent Literature 2 shown below discloses a vehicle communication terminal device and a communication system capable of appropriately transmitting desired information. Specifically, Patent Literature 2 discloses technology of adjusting the transmission rate of image information to be transmitted from a vehicle to an emergency report center in accordance with a wireless communication state when emergency occurs on the vehicle.

CITATION LIST

Patent Literature

PATENT LITERATURE 1: Japanese Laid-Open Patent Publication No. 2008-77143
PATENT LITERATURE 2: Japanese Laid-Open Patent Publication No. 2008-263580

SUMMARY OF INVENTION

Solution to Problem

A system according to an aspect of the present disclosure is a system including a server computer and an on-vehicle device of a vehicle which communicates with the server computer via a communication line. The on-vehicle device includes: a collecting unit configured to collect sensor information detected by a sensor provided to the vehicle; a transmission unit configured to transmit the sensor information collected by the collecting unit, to the server computer via the communication line; a reception unit configured to receive data including a line speed of the communication line in an expected traveling area of the vehicle, from outside of the vehicle; a line management unit configured to determine, as a predicted line speed, the line speed of the communication line at an expected traveling position of the vehicle in a future, on the basis of the data received by the reception unit; and a control unit configured to determine a parameter relevant to transmission of the sensor information collected by the collecting unit to the server computer, on the basis of the predicted line speed determined by the line management unit.

An on-vehicle device according to another aspect of the present disclosure includes: a collecting unit configured to collect sensor information detected by a sensor provided to a vehicle; a transmission unit configured to transmit the sensor information collected by the collecting unit, to a server computer via a communication line; a reception unit configured to receive data including a line speed of the communication line in an expected traveling area of the vehicle, from outside of the vehicle; a line management unit configured to determine, as a predicted line speed, the line speed of the communication line at an expected traveling position of the vehicle in a future, on the basis of the data received by the reception unit; and a control unit configured to determine a parameter relevant to transmission of the sensor information collected by the collecting unit to the server computer, on the basis of the predicted line speed.

A control method according to still another aspect of the present disclosure is a control method for controlling an on-vehicle device mounted on a vehicle, the control method including: a collecting step of collecting sensor information detected by a sensor provided to the vehicle; a transmission step of transmitting the sensor information collected in the collecting step, to a server computer via a communication line; a reception step of receiving data including a line speed of the communication line in an expected traveling area of the vehicle, from outside of the vehicle; a line management step of determining, as a predicted line speed, the line speed of the communication line at an expected traveling position of the vehicle in a future, on the basis of the data received in the reception step; and a control step of determining a parameter relevant to transmission of the sensor information collected in the collecting step to the server computer, on the basis of the predicted line speed determined in the line management step.

A computer program according to still another aspect of the present disclosure causes a computer mounted on a vehicle to implement: a collecting function of collecting sensor information detected by a sensor provided to the vehicle; a transmission function of transmitting the sensor information collected by the collecting function, to a server computer via a communication line; a reception function of receiving data including a line speed of the communication line in an expected traveling area of the vehicle, from outside of the vehicle; a line management function of determining, as a predicted line speed, the line speed of the communication line at an expected traveling position of the vehicle in a future, on the basis of the data received by the reception function; and a control function of determining a parameter relevant to transmission of the sensor information collected by the collecting function to the server computer, on the basis of the predicted line speed determined by the line management function.

BRIEF DESCRIPTION OF DRAWINGS

FIG. 7 shows the correspondence relationship between the line speed and control parameters in a table format.

DESCRIPTION OF EMBODIMENTS

Figure 1:
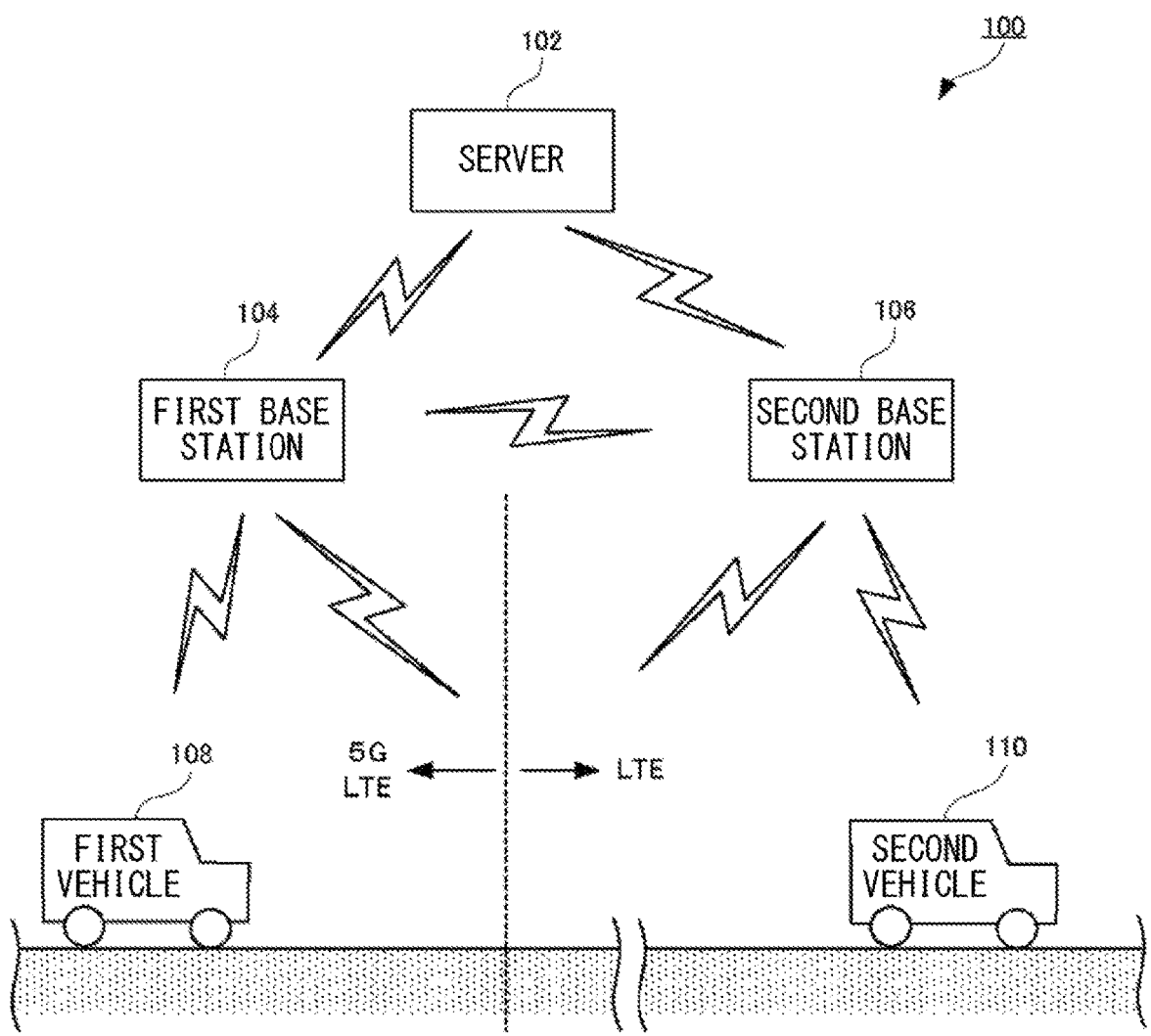
FIG. 1 is a block diagram showing the configuration of a driving support system according to an embodiment of the present disclosure.

[Problems to be Solved by the Present Disclosure]

In a cellular V2X system with 5G line installed, when a vehicle moves out of an area where communication can be provided by 5G line, switching from 5G line to LTE line occurs and thus the line speed greatly changes. As a result, the amount of data (in particular, the amount of measurement data from a sensor device mounted on the vehicle) that can be uploaded from the vehicle to a server computer (hereinafter, may be simply referred to as server) is limited. At present, LTE line widely spreads in Japan, but 5G line is limited to stations of major cities and downtown areas and is yet to spread. Therefore, it is expected that switching between 5G line and LTE line frequently occurs in communication devices mounted on vehicles.

When switching between 5G line and LTE line occurs, it is necessary to address this by, for example, increasing the buffer capacity or reducing the data to a size that enables transmission even on a low-speed line (data compression, data thinning, etc.) so that data that cannot be transmitted will not disappear. Therefore, in order to smoothly address switching between 5G line and LTE line, it is preferable to make preparation for addressing switching between 5G line and LTE line in advance before the switching occurs.

This is not limited to switching between 5G line and LTE line. The same applies also in a case where switching occurs between communication lines that are greatly different in the specifications of line speed. Further, even in a case of using the same communication line, the line speed can greatly change in accordance with the traveling environment (traveling location, traveling time, etc.) of the vehicle. Therefore, also in the case of using the same line, it is preferable to be able to predict change in the line speed in advance, in order to smoothly address change in the line speed. Patent Literature 1 and 2 cannot solve such a problem.

Accordingly, an object of the present disclosure is to provide a system, an on-vehicle device, a method, and a computer program for driving support that are capable of, on a vehicle side, immediately addressing change in the line speed of a communication line between the vehicle and a server, and appropriately transmitting data that can be used for driving support, from the vehicle to the server even when the line speed changes.

[Effects of the Present Disclosure]

According to the present disclosure, the on-vehicle device of a vehicle can perform transmission of sensor information to a server computer efficiently and without any trouble.

[Description of Embodiments of the Present Disclosure]

First, contents of embodiments of the present disclosure are listed and described. The embodiments described below may be, at least partially, freely combined with each other.

(1) A system according to a first aspect of the present disclosure is a system including a server computer and a first on-vehicle device of a first vehicle which communicates with the server computer via a communication line. The first on-vehicle device includes: a collecting unit configured to collect sensor information detected by a sensor provided to the first vehicle; a first transmission unit configured to transmit the sensor information collected by the collecting unit, to the server computer via the communication line; a reception unit configured to receive first data including a line speed of the communication line in an expected traveling area of the first vehicle, from outside of the first vehicle; a line management unit configured to determine, as a predicted line speed, the line speed of the communication line at an expected traveling position of the first vehicle in a future, on the basis of the first data received by the reception unit; and a control unit configured to determine a parameter relevant to transmission of the sensor information collected by the collecting unit to the server computer, on the basis of the predicted line speed determined by the line management unit.

Thus, shortly before the line speed actually changes, the first on-vehicle device can predict the line speed and appropriately set the parameter relevant to transmission of the sensor information to the server computer, whereby it is possible to appropriately and immediately adapt to change in the line speed. Therefore, the first on-vehicle device can perform transmission of the sensor information to the server computer efficiently and without any trouble.

(2) Preferably, the system further includes a second on-vehicle device of a second vehicle. The second on-vehicle device includes a generation unit configured to generate second data including information about a traveling position of the second vehicle and the line speed of the communication line at the traveling position, and a second transmission unit configured to transmit the second data to at least one of the first on-vehicle device and the server computer via the communication line. Thus, the first on-vehicle device can more assuredly acquire information about the line speed of the communication line on the traveling route of the first vehicle.

(3) More preferably, the second vehicle is a vehicle traveling in the expected traveling area of the first vehicle. Thus, the first on-vehicle device can acquire more reliable information about the line speed of the communication line on the traveling route.

(4) Further preferably, the server computer receives the second data transmitted from the second on-vehicle device, generates the first data from the received second data, and transmits the first data to the first on-vehicle device. Thus, the server computer can provide more reliable information about the line speed.

(5) Preferably, the first on-vehicle device transmits traveling route information indicating a traveling route of the first vehicle, to the server computer, and the server computer having received the traveling route information transmits the first data including a position on a road specified by the received traveling route information and the line speed of the communication line corresponding to the position, to the first on-vehicle device. Thus, the first on-vehicle device can acquire information about the line speed of the communication line on the traveling route of the first vehicle, at an appropriate timing.

(6) More preferably, the first transmission unit of the first on-vehicle device further transmits traveling route information indicating a traveling route of the first vehicle, to the second on-vehicle device, and the second transmission unit of the second on-vehicle device further transmits the second data including a position on a road specified by the received traveling route information and the line speed of the communication line corresponding to the position, to the first on-vehicle device. Thus, the first on-vehicle device can acquire information about the line speed of the communication line on the traveling route of the first vehicle, at an appropriate timing.

(7) Further preferably, the server computer transmits third data including a position on a road and the line speed of the communication line corresponding to the position, to the first on-vehicle device, the reception unit receives the third data, and the line management unit extracts the line speed corresponding to a position in the expected traveling area, from the third data received by the reception unit, and using the extracted line speed as the first data, determines the predicted line speed. Thus, even when the traveling route of the first vehicle has changed, the first on-vehicle device can appropriately determine the predicted line speed without acquiring new line speed information from outside.

(8) Preferably, the second data is received by the first on-vehicle device via an on-vehicle device of a third vehicle. Thus, the first on-vehicle device can more assuredly acquire information about the line speed of the communication line.

(9) More preferably, the parameter includes a transmission speed of data including the sensor information to be transmitted from the first transmission unit. Thus, the first on-vehicle device can perform data transmission to the server computer efficiently and without any trouble.

(10) Further preferably, the first on-vehicle device further includes a buffer unit configured to, after storing the sensor information outputted from the collecting unit, output the sensor information to the first transmission unit, and the parameter includes a parameter indicating a size of the buffer unit. Thus, the first on-vehicle device can appropriately determine the size of the buffer, and can prevent overflow of the buffer or such inefficiency that a buffer larger than necessary is prepared.

(11) Preferably, the parameter includes a parameter indicating a speed for collecting the sensor information detected by the sensor. Thus, the first on-vehicle device can perform appropriate processing at the initial stage of collecting sensor information to be transmitted, so that processing at the subsequent stage will not be inefficient.

(12) More preferably, the control unit includes a table in which a plurality of line speed ranges and a plurality of values of the parameter are one-to-one associated, and the control unit refers to the table for the predicted line speed, to determine the value of the parameter corresponding to the predicted line speed. Thus, it is possible to immediately determine the value of the parameter in accordance with the predicted line speed.

(13) Further preferably, when there are a plurality of possible traveling routes in an advancing direction of the first vehicle, the server computer transmits the first data about the plurality of respective possible traveling routes, to the first on-vehicle device, and after the first vehicle starts to travel through one of the plurality of possible traveling routes, the line management unit determines the predicted line speed, using the first data about the possible traveling route including a position where the first vehicle is traveling. Thus, the server computer can decrease the number of times of transmission of the first data including line speed information to the first on-vehicle device. The first on-vehicle device can appropriately determine the predicted line speed even when the traveling route of the first vehicle is changed.

(14) Preferably, the line management unit determines the expected traveling position of the first vehicle in the future on the basis of at least one of a speed of the first vehicle, an acceleration of the first vehicle, and a traffic condition around the first vehicle, and determines the predicted line speed corresponding to the expected traveling position. Thus, the first on-vehicle device can more accurately determine the predicted line speed.

(15) More preferably, the reception unit receives the first data about a plurality of respective communication lines, and the line management unit determines the predicted line speed on the basis of the first data corresponding to the communication line being used by the first transmission unit for communication with the server computer. Thus, even if the first on-vehicle device supports only a specific communication line, the first on-vehicle device can appropriately determine the predicted line speed and can perform data transmission to the server computer efficiently and without any trouble.

(16) An on-vehicle device according to a second aspect of the present disclosure includes: a collecting unit configured to collect sensor information detected by a sensor provided to a vehicle; a transmission unit configured to transmit the sensor information collected by the collecting unit, to a server computer via a communication line; a reception unit configured to receive data including a line speed of the communication line in an expected traveling area of the vehicle, from outside of the vehicle; a line management unit configured to determine, as a predicted line speed, the line speed of the communication line at an expected traveling position of the vehicle in a future, on the basis of the data received by the reception unit; and a control unit configured to determine a parameter relevant to transmission of the sensor information collected by the collecting unit to the server computer, on the basis of the predicted line speed. Thus, shortly before the line speed actually changes, the on-vehicle device can predict the line speed and appropriately set the parameter relevant to transmission of the sensor information to the server computer, whereby it is possible to appropriately and immediately adapt to change in the line speed. Therefore, the on-vehicle device can perform transmission of the sensor information to the server computer efficiently and without any trouble.

(17) A control method according to a third aspect of the present disclosure is a method for controlling an on-vehicle device mounted on a vehicle. This control method includes: a collecting step of collecting sensor information detected by a sensor provided to the vehicle; a transmission step of transmitting the sensor information collected in the collecting step, to a server computer via a communication line; a reception step of receiving data including a line speed of the communication line in an expected traveling area of the vehicle, from outside of the vehicle; a line management step of determining, as a predicted line speed, the line speed of the communication line at an expected traveling position of the vehicle in a future, on the basis of the data received in the reception step; and a control step of determining a parameter relevant to transmission of the sensor information collected in the collecting step to the server computer, on the basis of the predicted line speed determined in the line management step. Thus, shortly before the line speed actually changes, the on-vehicle device can predict the line speed and appropriately set the parameter relevant to transmission of the sensor information to the server computer, whereby it is possible to appropriately and immediately adapt to change in the line speed. Therefore, the on-vehicle device can perform transmission of the sensor information to the server computer efficiently and without any trouble.

(18) A computer program according to a fourth aspect of the present disclosure causes a computer mounted on a vehicle to implement: a collecting function of collecting sensor information detected by a sensor provided to the vehicle; a transmission function of transmitting the sensor information collected by the collecting function, to a server computer via a communication line; a reception function of receiving data including a line speed of the communication line in an expected traveling area of the vehicle, from outside of the vehicle; a line management function of determining, as a predicted line speed, the line speed of the communication line at an expected traveling position of the vehicle in a future, on the basis of the data received by the reception function; and a control function of determining a parameter relevant to transmission of the sensor information collected by the collecting function to the server computer, on the basis of the predicted line speed determined by the line management function. Thus, shortly before the line speed actually changes, the computer mounted on the vehicle can predict the line speed and appropriately set the parameter relevant to transmission of the sensor information to the server computer, whereby it is possible to appropriately and immediately adapt to change in the line speed. Therefore, the computer mounted on the vehicle can perform transmission of the sensor information to the server computer efficiently and without any trouble.

[Details of Embodiment of the Present Disclosure]

In the following embodiments, the same components are denoted by the same reference characters. The same applies to the names and the functions thereof. Therefore, detailed description thereof will not be given repeatedly.

(Embodiments)

[Entire Configuration]

With reference to FIG. 1, a driving support system 100 according to an embodiment of the present disclosure includes a server computer (hereinafter, referred to as server) 102, a first base station 104, a second base station 106, a first vehicle 108, and a second vehicle 110. The second vehicle 110 is traveling in an area (e.g., front area in advancing direction) where the first vehicle 108 is going to travel in the future. The server 102 provides information (hereinafter, referred to as driving support information) useful for driving, to on-vehicle devices of the first vehicle 108 and the second vehicle 110, to support respective drivers thereof. Communication between elements constituting the driving support system 100 is performed via known mobile communication lines. Here, the first base station 104 provides a service by LTE line and 5G line, whereas the second base station 106 provides a communication service by LTE line but does not provide a communication service by 5G line. That is, the left side with respect to a broken line in FIG. 1 is a service area (hereinafter, may be referred to as 5G area) based on 5G line, and both left and right areas are service areas (hereinafter, may be referred to as LTE areas) based on LTE line.

The on-vehicle devices mounted on the first vehicle 108 and the second vehicle 110 each have communication functions using LTE line and 5G line. While traveling in the 5G area, the first vehicle 108 can perform high-speed communication using 5G line with the server 102, but when moving out of the 5G area (still being in the LTE area), the first vehicle 108 can perform only communication using LTE line, and thus the communication speed is reduced.

In FIG. 1, two base stations are shown as representatives of a plurality of base stations, but base stations are not limited thereto. Normally, more base stations are provided. Also regarding vehicles, two vehicles are shown as representatives in FIG. 1. However, without limitation thereto, the server 102 can communicate with on-vehicle devices of more vehicles, collect and analyze information, and provide driving support information.

[Hardware Configuration of On-Vehicle Device]

Figure 2:
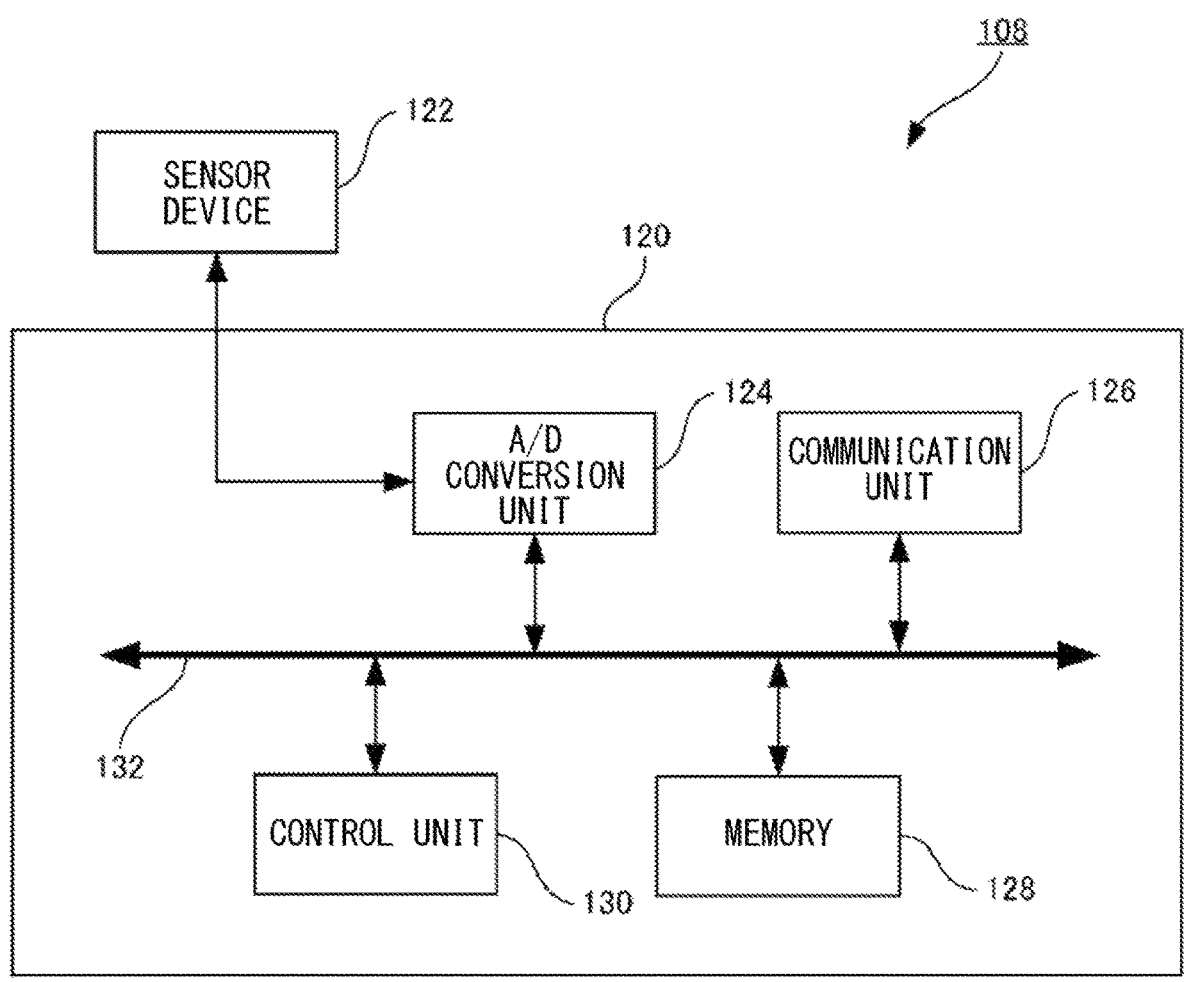
FIG. 2 is a block diagram showing a hardware configuration of an on-vehicle device.

With reference to FIG. 2, an example of a hardware configuration of an on-vehicle device 120 mounted on the first vehicle 108 will be shown. The on-vehicle device 120 includes an A/D conversion unit 124 connected to a sensor device 122, a communication unit 126 for performing communication, a memory 128 for storing data, a control unit 130 for controlling these components, and a bus 132 for transferring data between these components.

The sensor device 122 is a known sensor mounted on the first vehicle 108. The vehicle is provided with various sensors, and among these, the sensor device 122 is the one that serves to generate driving support information. The sensor device 122 is, for example, a digital camera (CCD camera, CMOS camera), a radar (millimeter wave radar, laser radar), or the like. The sensor device 122 senses an object and outputs a detection signal (e.g., analog signal).

The detection signal from the sensor device 122 is inputted to the A/D conversion unit 124. The A/D conversion unit 124 samples the inputted analog signal at a predetermined frequency, and generates and outputs digital data. The generated digital data is stored in the memory 128. The memory 128 is, for example, a rewritable nonvolatile semiconductor memory, or a hard disk drive (hereinafter, referred to as HDD).

The communication unit 126 has communication functions using LTE line and 5G line, and performs communication with the first base station 104 and the second base station 106. Communication between the first vehicle 108 and the server 102, or communication between the first vehicle 108 and the second vehicle 110, is performed via the first base station 104 and the second base station 106. The communication unit 126 is composed of an IC for performing modulation and multiplexing adopted for each of LTE line and 5G line, an antenna for radiating and receiving radio waves having a predetermined frequency, an RF circuit, and the like.

The control unit 130 includes a central processing unit (CPU), and controls corresponding components to implement functions of the on-vehicle device 120 described later.

[Hardware Configuration of Server]

Figure 3:
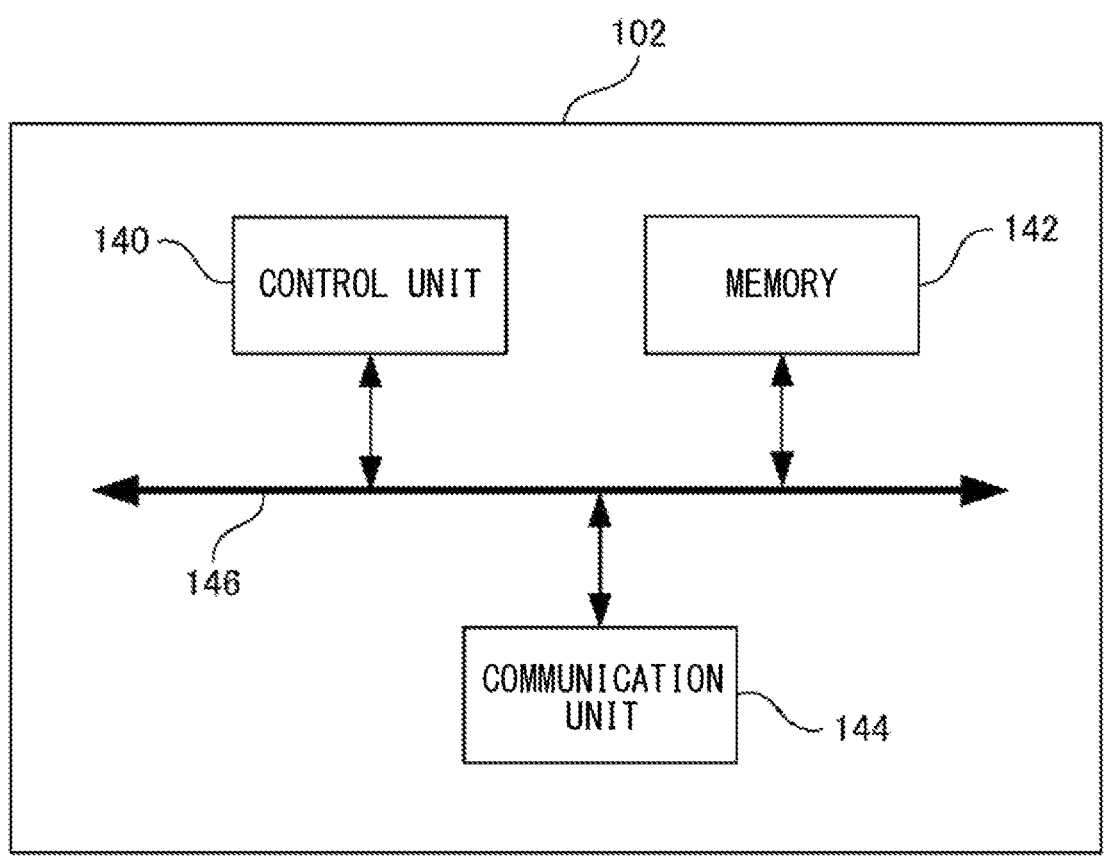
FIG. 3 is a block diagram showing a hardware configuration of a server computer.

With reference to FIG. 3, the server 102 includes a control unit 140, a memory 142, a communication unit 144, and a bus 146. Data transfer between these components is performed via the bus 146. The control unit 140 includes, for example, a CPU, and controls corresponding components to implement various functions of the server 102. The communication unit 144 receives, via the first base station 104 or the second base station 106, sensor information uploaded from the on-vehicle devices of the first vehicle 108 and the second vehicle 110 and information uploaded from sensors (not shown in FIG. 1) such as a camera installed on a road and the like. The communication unit 144 acquires the speeds of communication lines with the first vehicle 108, the second vehicle 110, and sensor devices such as a camera installed on a road and the like. The memory 142 includes a rewritable nonvolatile semiconductor memory and a large-capacity storage device such as HDD. Data received by the communication unit 144 is transferred to the memory 142 so as to be stored as a database. The control unit 140 reads data from the memory 142 as appropriate, executes predetermined analysis processing (e.g., analysis for obtaining driving support information to be provided to the on-vehicle device of the vehicle in a driving support service), and stores a result thereof in the memory 142.

[Functional Configuration of On-Vehicle Device]

Figure 4:
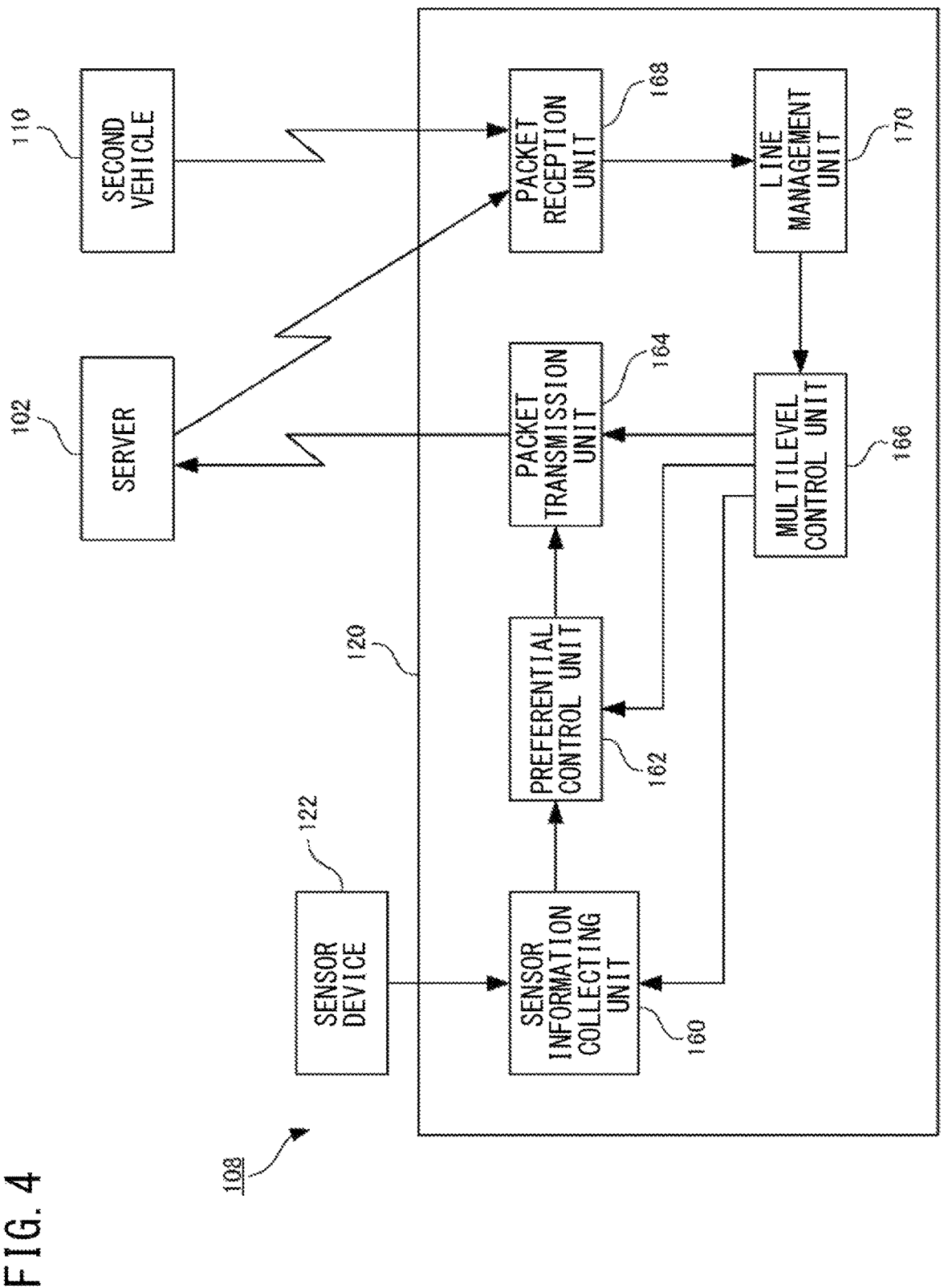
FIG. 4 is a block diagram showing a functional configuration of the on-vehicle device.

With reference to FIG. 4, the function of the on-vehicle device 120 will be described. The on-vehicle device 120 includes a sensor information collecting unit 160, a preferential control unit 162, a packet transmission unit 164 for transmitting packet data, a multilevel control unit 166 for controlling these components, a packet reception unit 168 for receiving packet data, and a line management unit 170. The sensor information collecting unit 160 acquires information from the sensor device 122. The preferential control unit 162 buffers acquired information.

A detection signal from the sensor device 122 is acquired as sensor information by the sensor information collecting unit 160. The function of the sensor information collecting unit 160 is implemented by the A/D conversion unit 124 shown in FIG. 2, for example. The sensor information collecting unit 160 is controlled by the multilevel control unit 166. Specifically, information (parameter) about a data take-in speed is sent from the multilevel control unit 166 to the sensor information collecting unit 160, and the sensor information collecting unit 160 takes in a detection signal from the sensor device 122, as digital data, at the data take-in speed specified by the multilevel control unit 166. Normally, a detection signal is outputted at constant timings from the sensor device 122. Therefore, when a low data take-in speed is indicated, the sensor information collecting unit 160 outputs only a part of sampled data. For example, in a case where a detection signal from the sensor device 122 is image data, the data is thinned on a frame basis, to be outputted.

The data taken in by the sensor information collecting unit 160 is inputted to the preferential control unit 162, and is temporarily stored by the preferential control unit 162. The function of the preferential control unit 162 is implemented by the memory 128 shown in FIG. 2, for example. That is, a partial area in the memory 128 is used as a buffer memory. The preferential control unit 162 is controlled by the multilevel control unit 166. Specifically, information (parameter) about a buffer size is sent from the multilevel control unit 166 to the preferential control unit 162, and the preferential control unit 162 prepares a memory with a size specified by the multilevel control unit 166, as a buffer.

The packet transmission unit 164 acquires data from the buffer of the preferential control unit 162, and generates packet data in a format and a size adapted to a communication line (LTE or 5G) currently used. Thereafter, the packet transmission unit 164 modulates and multiplexes the generated packet data in accordance with the communication line currently used, and outputs the data as radio waves having a predetermined frequency from the antenna. The packet transmission unit 164 is implemented by the communication unit 126 shown in FIG. 2, for example. The packet transmission unit 164 is controlled by the multilevel control unit 166. Specifically, information (parameter) about transmission speed is sent from the multilevel control unit 166 to the packet transmission unit 164, and the packet transmission unit 164 transmits the generated packet at the transmission speed specified by the multilevel control unit 166. Thus, the on-vehicle device 120 can upload information collected from the sensor device 122, to the server 102 as appropriate, so as to provide the information for analysis by the server 102. It is noted that the server 102 also receives sensor information uploaded from an on-vehicle device of a vehicle other than the first vehicle 108 in the same manner, and provides a result of analysis thereon as driving support information to the on-vehicle device 120 of the first vehicle 108.

As described above, the multilevel control unit 166 sends the parameters to the sensor information collecting unit 160, the preferential control unit 162, and the packet transmission unit 164, and controls the respective operations thereof. The multilevel control unit 166 is implemented by the control unit 130 shown in FIG. 2, for example. Although described in detail later, the multilevel control unit 166 determines the parameters in accordance with a predicted line speed sent from the line management unit 170.

The packet reception unit 168 receives and demodulates radio waves, and generates packet data. If the received packet data includes line speed information, the packet reception unit 168 sends the data to the line management unit 170. The other packet data is stored into the memory 128 as necessary, so as to be used by an operation system, another application program, or the like. The packet reception unit 168 is implemented by the communication unit 126 shown in FIG. 2, for example.

Here, the line speed information includes information about the actual communication line speed at each position in a target area where the server 102 provides a driving support service, for example. For example, the line speed information is array data {xi, yi, pi} in which route information (M sets of position coordinates (xi, yi), where i is a natural number from 1 to M) through which the vehicle is going to travel, and a line speed pi (bps) at each position on the route, are associated with each other. For example, when the first vehicle 108 is traveling in the direction of an arrow on a map shown in FIG. 5, the traveling route of the first vehicle 108 is indicated by a broken-line traveling route 182, for example. The line speed information acquired from the server 102 by the first vehicle 108 is a line speed at, of the positions on the traveling route 182, a position in a predetermined range 180 (i.e., range from the present position of the first vehicle 108 to a boundary point 184). Although described in detail later, the on-vehicle device 120 of the first vehicle 108 can acquire line speed information by transmitting information about the traveling route of the first vehicle 108 to the server 102. The line speed information can be shown by a graph with a position indicated on the horizontal axis, as shown in FIG. 6, for example. In FIG. 6, this is indicated by a continuous graph, but is actually collection of a plurality of points. FIG. 6 shows a line speed on the route (traveling route 182 in FIG. 5) through which the first vehicle 108 is going to travel in the future, from the present position (traveling position) thereof. The graph in FIG. 6 shows that, for example, the first vehicle 108 can presently perform high-speed communication at line speed p1 (bps) by 5G line, and then, when the first vehicle 108 further travels to be out of the 5G area, the line speed reduces to p2 (bps). The line speed information is not limited to the line speed on the traveling route 182, but may include the line speed in a predetermined area (hereinafter, referred to as expected traveling area) including the vicinity thereof. Also in this case, the line speed information can be represented by array data {xi, yi, pi} in which the position coordinates (xi, yi) in the expected traveling area and the line speed pi at that position are associated with each other.

Figure 5:
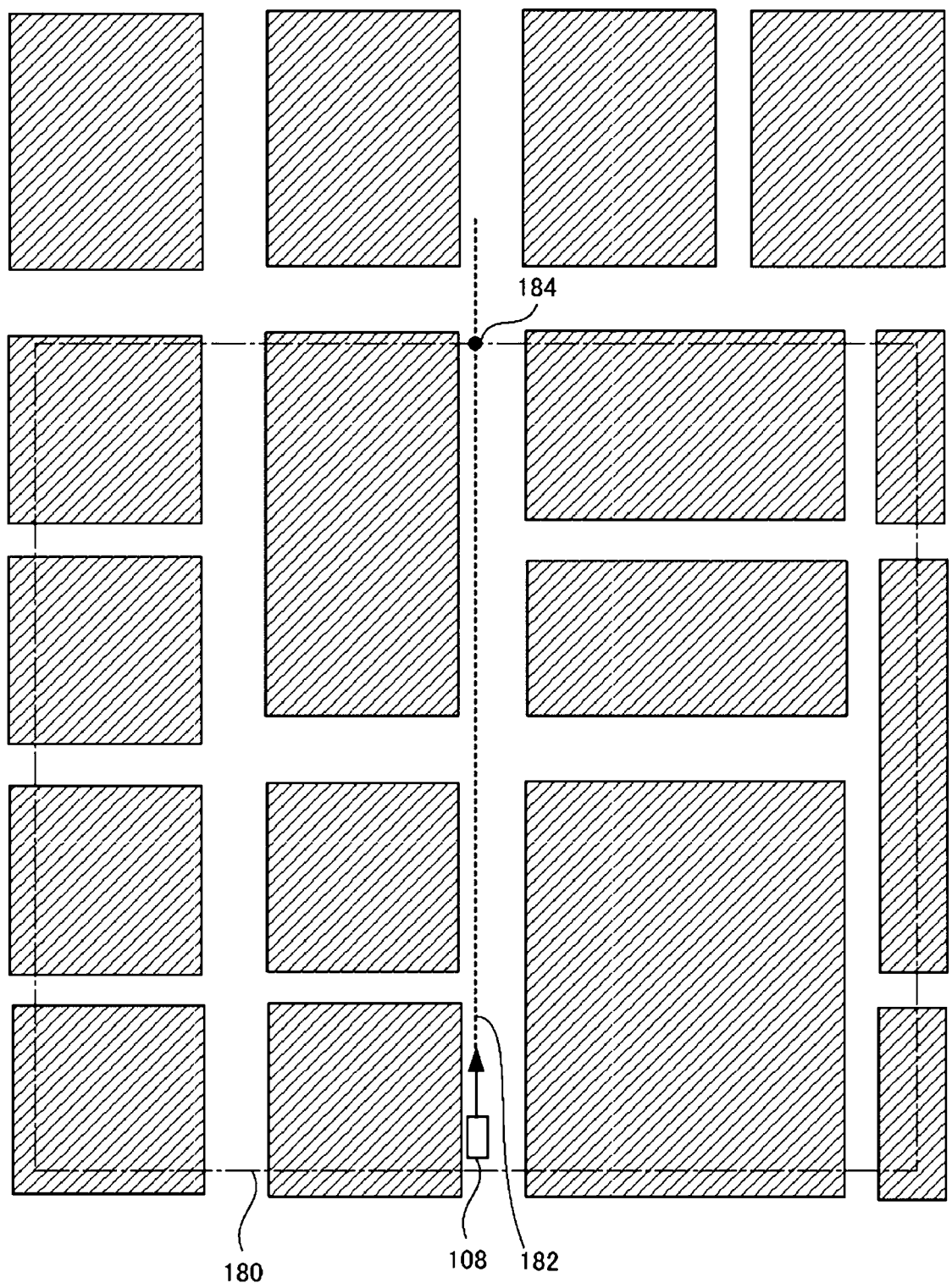
FIG. 5 is a schematic view showing a traveling route of a vehicle.
Figure 6:
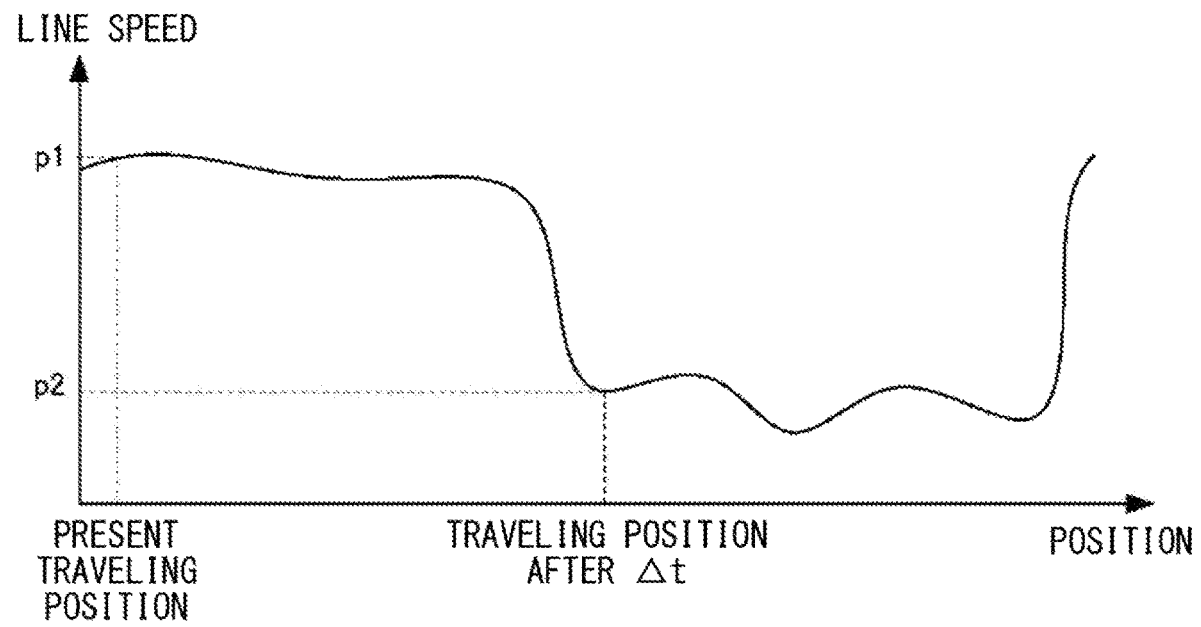
FIG. 6 is a graph showing a process for specifying a predicted line speed.

In FIG. 5, the traveling route of the first vehicle 108 is indicated by a line along the road in the traveling direction of the first vehicle 108, but is not limited thereto. For example, in a case where a destination is set on a car navigation system (the on-vehicle device 120 may have a car navigation function) mounted on the first vehicle 108, line speed information along the route determined by the car navigation system may be acquired. In this case, the first vehicle 108 may transmit the route information acquired from the car navigation system, to the server 102. The shape of the predetermined range 180 shown in FIG. 5 is not limited to a rectangular shape, and may be any shape. For example, a round shape or an elliptic shape may be adopted.

When the line management unit 170 has received the line speed information from the packet reception unit 168, the line management unit 170 determines a line speed (hereinafter, referred to as predicted line speed) for an expected traveling position of the first vehicle 108 in the future, and sends the predicted line speed to the multilevel control unit 166. The expected traveling position of the first vehicle 108 in the future is the expected position of the first vehicle 108 after a predetermined time Δt, for example. Here, Δt is a constant value set in advance in a unit of second or minute, for example. The line management unit 170 is implemented by the control unit 130 shown in FIG. 2, for example. Specifically, the line management unit 170 manages the traveling position and the traveling speed of the first vehicle 108 at present. When the line management unit 170 receives the line speed information {xi, yi, pi} (i is a natural number from 1 to M) from the packet reception unit 168, the line management unit 170 calculates position coordinates (x, y) of the vehicle after elapse of the predetermined time Δt from the present, using the traveling position and the traveling speed at present. Subsequently, the line management unit 170 specifies the corresponding line speed by referring to the line speed information at the calculated position coordinates, and determines the specified line speed as the predicted line speed. If the corresponding position coordinates are not present, for example, the line speed at the position coordinates closest thereto may be employed as the predicted line speed. In addition, the line speed (predicted line speed) at the corresponding position coordinates may be calculated by interpolation, using plural pieces of information in the line speed information. For determination of the expected traveling position coordinates (x, y) of the first vehicle 108 in the future, the traffic condition around the first vehicle 108 may also be taken into consideration, whereby the predicted line speed can be determined more accurately. The value of Δt may be set in accordance with the vehicle speed at the time when the predicted line speed is to be determined.

The line speed is classified into a plurality of levels, and is managed in a multilevel control management table as shown in FIG. 7. In the multilevel control management table shown in FIG. 7, the line speed not less than 0 is divided into N ranges, each of which is denoted by an index (natural number from 1 to N). The multilevel control unit 166 stores the multilevel control management table shown in FIG. 7. The multilevel control unit 166 determines the index to which the predicted line speed (line speed p at the expected traveling position in the future) sent from the line management unit 170 corresponds. Thus, the corresponding parameters (sensor information collection speed q (fps: frame per second), transmission buffer size r (byte), and sensor information transmission speed s (bps: bit per second)) are immediately determined. Here, the sensor information collection speed q is set in a unit of frame (fps), assuming a video image detected by a camera or the like. Since the format of an outputted detection signal differs depending on each sensor device, it is preferable that the sensor information collection speed q is set in accordance with each sensor device. Depending on the sensor device, the sensor information collection speed q can be set in bps.

The multilevel control unit 166 sends the determined parameters to the sensor information collecting unit 160, the preferential control unit 162, and the packet transmission unit 164, respectively. Thus, the sensor information collecting unit 160, the preferential control unit 162, and the packet transmission unit 164 start operations with the specified conditions, as described above. The multilevel control management table shown in FIG. 7 is set such that, as the index becomes greater, the line speed and the parameters corresponding thereto become greater. That is, where i is a natural number from 1 to N, the values of $p_i$, $Q_i$, $R_i$, and $S_i$ are set such that $p_{i-1} < p_i$, $Q_{i-1} < Q_i$, $R_{i-1} < R_i$, and $S_{i-1} < S_i$ are satisfied.

The hardware configuration for implementing the functions in FIG. 4 is not limited to that shown in FIG. 2, and may be any configuration. For example, the components in FIG. 4 may be formed by including a CPU or a microcomputer, or may be partially implemented by a dedicated IC.

In the above description, the case where the line speed information is provided as array data {xi, yi, pi} (i is a natural number from 1 to M), has been shown. However, without limitation thereto, the line speed information may be in any format. For example, only the line speed {pi} (i is a natural number from 1 to M) may be provided if it is prescribed that the line speed is to be provided at predetermined intervals along a road. The line speed p may be provided as a function (approximate function) of the position coordinates (x, y). In this case, the load on the server 102 increases (due to calculation in the function p(x, y) for the line speed), but the data amount of line speed information to be transmitted is significantly reduced.

[Operation]

Figure 8:
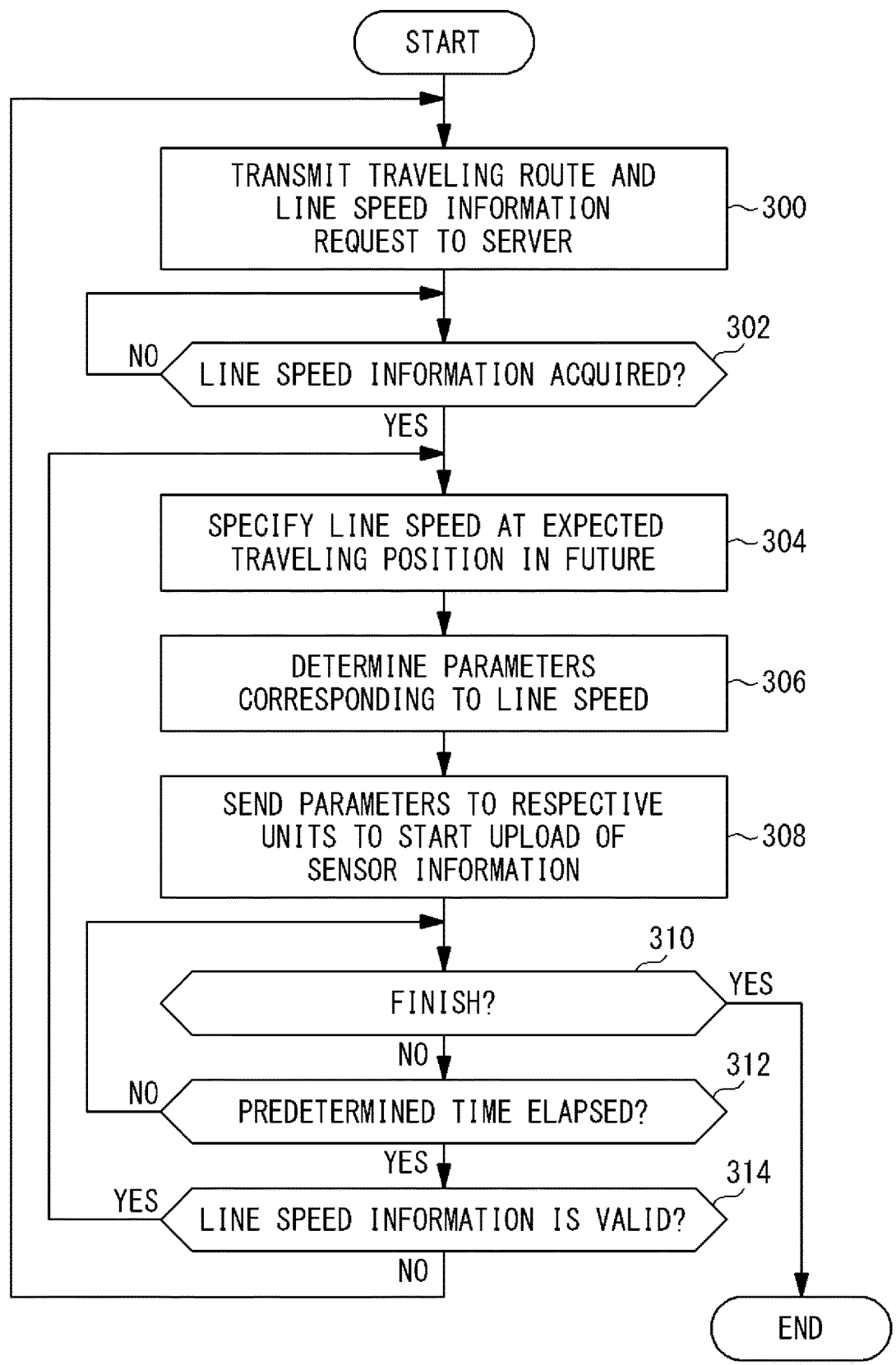
FIG. 8 is a flowchart showing operation of the on-vehicle device.
Figure 9:
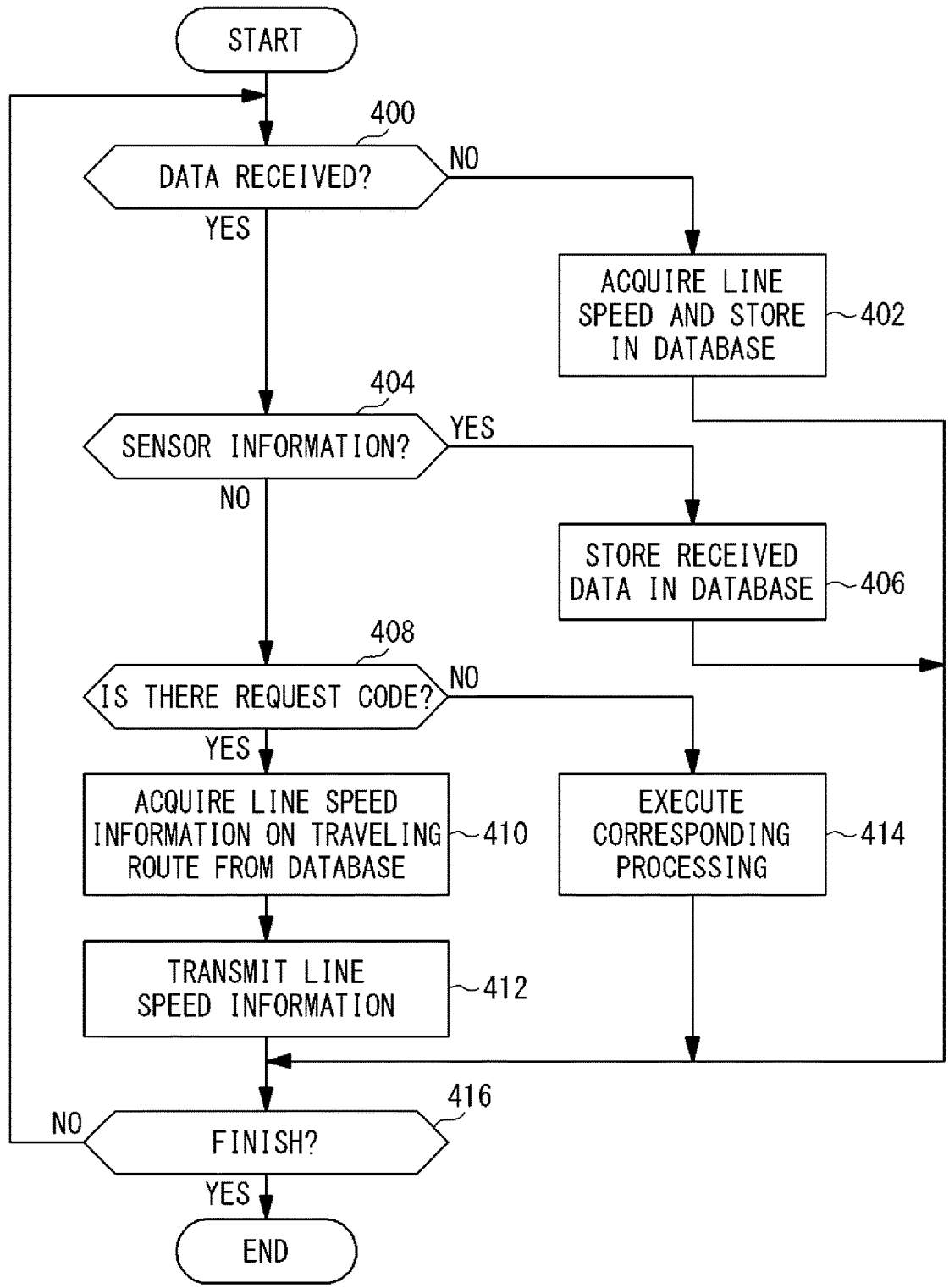
FIG. 9 is a flowchart showing operation of a server.

With reference to FIG. 8 and FIG. 9, operation of the driving support system 100 will be described by describing operations of the on-vehicle device 120 of the first vehicle 108 and the server 102. The process shown in FIG. 8 is implemented by the control unit 130 reading a predetermined program from the memory 128 and executing the same. The process shown in FIG. 9 is implemented by the control unit 140 reading a predetermined program from the memory 142 and executing the same.

With reference to FIG. 8, in step 300, the control unit 130 transmits information about the traveling route of the first vehicle 108 and a line speed information request to the server 102. Specifically, the control unit 130 generates packet data including information about the position coordinates and the advancing direction (orientation) of the first vehicle 108 at present, a predetermined request code (hereinafter, referred to as "line speed information request code"), transmission source information (self-identifying information), and transmission destination information indicating the server 102 as a transmission destination. Subsequently, the control unit 130 transmits the generated packet data via the communication unit 126. As the information about the position coordinates and the advancing direction (orientation) at present, information managed in the car navigation can be used. The line speed information request code may be any code that is prescribed in advance between the on-vehicle device 120 and the server 102 (more specifically, programs operated in the on-vehicle device 120 and the server 102).

In step 302, the control unit 130 determines whether or not line speed information has been acquired from the server 102. Acquisition of the line speed information is the function of the packet reception unit 168 in FIG. 4. If it is determined that the line speed information has been received, the control proceeds to step 304. Otherwise, the processing in step 302 is repeated. As described later, when the server 102 has received the packet including the line speed information request code, the server 102 transmits packet data including the corresponding line speed information. Therefore, a predetermined code (hereinafter, referred to as "line speed information transmission code") may be included in the packet data. If the line speed information transmission code is included in the received packet data, the control unit 130 can determine that the line speed information has been received.

In step 304, as described above, the control unit 130 determines an expected traveling position of the first vehicle 108 in the future, using the received line speed information, and specifies a line speed corresponding to the expected traveling position. This is the function by the line management unit 170 in FIG. 4.

In step 306, the control unit 130 refers to the stored multilevel control management table (FIG. 7) for the line speed p specified in step 304, to determine the corresponding level (index), and determines the parameters corresponding thereto. This is the function by the multilevel control unit 166 in FIG. 4. Thus, a set of the sensor information collection speed q, the transmission buffer size r, and the sensor information transmission speed s is determined.

In step 308, the control unit 130 sends the set of parameters determined in step 306 to the corresponding units to start upload of the sensor information. This is the function by the multilevel control unit 166 in FIG. 4. That is, the sensor information collection speed q is sent to the sensor information collecting unit 160, the transmission buffer size r is sent to the preferential control unit 162, and the sensor information transmission speed s is sent to the packet transmission unit 164. Thus, the detection signal from the sensor device 122 is acquired as digital data by the sensor information collecting unit 160, buffered by the preferential control unit 162, and then incorporated into packet data by the packet transmission unit 164. Then, the packet data is transmitted as sensor information to the server 102.

In step 310, the control unit 130 determines whether or not a finish instruction is made. The finish instruction is made by powering off the on-vehicle device 120, for example. If it is determined that the finish instruction is made, this program is finished. Otherwise, the control proceeds to step 312.

In step 312, the control unit 130 determines whether or not a predetermined period has elapsed since execution of the processing in step 308 (sending parameters to the corresponding units). The control unit 130 can recognize elapse of the predetermined period by an internal timer. For example, at the end of the processing in step 308, the control unit 130 acquires the present time from the timer and stores the present time as a reference time, and thereafter, acquires the present time from the timer and compares the present time with the reference time, whereby the control unit 130 can determine whether or not the predetermined period has elapsed. If it is determined that the predetermined period has elapsed, the control proceeds to step 314. Otherwise, the control returns to step 310. Thus, acquisition and upload of sensor information are performed with the parameters indicated to the respective units in step 308, until the predetermined period has elapsed.

In step 314, the control unit 130 determines whether or not the line speed information stored at present is valid. In a case where the first vehicle 108 is traveling, as time elapses, the line speed information acquired from the server 102 and stored comes to include only the line speed information corresponding to the positions that have been already passed, so that the line speed at the expected traveling position in the future can be no longer predicted. For example, the control unit 130 calculates the distance between the present traveling position and a position that has not been passed yet and is farthest from the present traveling position, among the position coordinates included in the stored line speed information. If the distance is greater than a predetermined value, the control unit 130 can determine that the line speed information stored at present is valid. Otherwise, the control unit 130 can determine that the line speed information is not valid.

If it is determined that the line speed information stored at present is valid, the control returns to step 304. Thus, on the basis of the line speed information stored at present and the present traveling position, a predicted line speed is specified again, and the corresponding parameters are determined. On the other hand, if it is determined that the present line speed information is not valid, the control returns to step 300. Thus, the control unit 130 requests the server 102 to transmit line speed information again, and when new line speed information is acquired, in the same manner as described above, the control unit 130 can specify a predicted line speed and determine the corresponding parameters. Therefore, while always using valid line speed information, shortly before (e.g., Δt) the line speed actually changes, the on-vehicle device 120 of the first vehicle 108 can predict the line speed and indicate appropriate parameters to the respective units, whereby processing appropriately adapted to change in the line speed can be immediately executed.

[Operation of Server]

With reference to FIG. 9, in step 400, the control unit 140 determines whether or not packet data has been received via the communication unit 144. If it is determined that packet data has been received, the control proceeds to step 404. Otherwise, the control proceeds to step 402.

In step 402, the control unit 140 acquires the present line speeds of the communication lines on roads and therearound in the area where the server 102 is providing a service, and stores the line speeds in a predetermined database of the memory 142. Thereafter, the control proceeds to step 416. For example, the control unit 140 transmits data in a predetermined size with a predetermined command (e.g., ping command or a command corresponding thereto), to vehicles (including a traveling vehicle, a stopped vehicle, and a parked vehicle), sensor devices (monitoring devices), and the like located on roads and thereround in the service area. The control unit 140 can calculate the line speeds by receiving corresponding responses therefrom. If the position information (xi, yi) (GPS information, etc.) of the responding vehicle or device is included in the data transmitted as a response from the vehicle or the device, the calculated line speed pi can be stored in association with the position information as line speed information {xi, yi, pi} in the database of the memory 142. In a case where a new line speed is acquired for the same position, for example, an old line speed is updated by the new line speed. It is noted that the old line speed may be stored for a predetermined period. Through repetition of step 402, the latest line speed information regarding roads in the service area of the server 102 is stored in the database.

In step 404, the control unit 140 determines whether or not sensor information is included in the packet data received in step 400. If it is determined that sensor information is included, the control proceeds to step 406. Otherwise, the control proceeds to step 408. The sensor information is uploaded from the on-vehicle device 120 of the first vehicle 108 to the server 102 as described above. Also from the second vehicle 110 other than the first vehicle 108, information of a sensor mounted on the second vehicle 110 is uploaded to the server 102. In addition, information from the sensor devices installed on roads is also uploaded to the server 102.

In step 406, the control unit 140 stores the received sensor information in a predetermined database of the memory 142. Thereafter, the control proceeds to step 416. The stored data is separately analyzed by an analysis program. The analysis result is transmitted as driving support information to the first vehicle 108 as necessary.

In step 416, the control unit 140 determines whether or not a finish instruction is made. The finish instruction is made by an instruction for stopping the program being executed, for example. If the finish instruction is received, the present program is finished. If the finish instruction has not been received, the control returns to step 400.

In step 404, if it is determined that sensor information has not been received, in step 408, the control unit 140 determines whether or not a line speed information request has been received. As described above, a packet including a line speed information request code is transmitted from the first vehicle 108. If a line speed information request code is included in the received packet, the control unit 140 determines that a line speed information request has been received. If it is determined that a line speed information request has been received, the control proceeds to step 410. Otherwise, the control proceeds to step 414.

In step 410, the control unit 140 acquires line speed information from the memory 142. As described above, the packet including the line speed information request code, transmitted from the on-vehicle device 120 of the first vehicle 108, includes the traveling route information (information about the position coordinates and the advancing direction (orientation) of the first vehicle 108 at present). Therefore, using this, the control unit 140 acquires line speed information in a map area for a predetermined range, from the line speed information stored in the database (see step 402) of the memory 142. For example, the control unit 140 specifies the traveling route 182 in the predetermined range 180 as shown in FIG. 5 on the basis of the position information and the advancing direction information of the first vehicle 108 at present received from the first vehicle 108. Subsequently, the control unit 140 reads the position coordinates (xi, yi) on the traveling route 182 and the line speed pi corresponding thereto, from the memory 142. Since the line speed information stored in the database of the memory 142 includes a line speed acquired from a vehicle traveling in the service area, the server computer can provide line speed information with higher reliability. It is noted that, as described above, without limitation to the line speed on the traveling route 182, line speed information in an expected traveling area may be transmitted.

In step 412, the control unit 140 generates packet data including the line speed information (array data {xi, yi, pi}) read in step 410, and transmits the packet data via the communication unit 144. In the packet data to be transmitted, a line speed information transmission code is added, and the transmission source information of the packet data (including the line speed information request code) received in step 400 is added as transmission destination information.

In step 408, if it is not determined that a line speed information request has been received, in step 414, the control unit 140 executes corresponding processing. In the server 102, processing other than the driving support service is also executed. Therefore, the control unit 140 passes the received packet data to another program.

As described above, when the server 102 has received packet data including a line speed information transmission code from the on-vehicle device 120 of the first vehicle 108, the server 102 can transmit line speed information in an expected traveling area for the first vehicle 108, to the on-vehicle device 120. In addition, when the server 102 has received sensor information from the on-vehicle device 120 of the first vehicle 108, the server 102 can store and analyze the sensor information as appropriate. The analysis result is provided as driving support information to the on-vehicle device 120 of the first vehicle 108.

In the above description, the case of setting all of the sensor information collection speed, the transmission buffer size, and the sensor information transmission speed to appropriate values in accordance with the predicted line speed, has been shown, but another configuration is also applicable. At least one parameter of the sensor information collection speed, the transmission buffer size, and the sensor information transmission speed may be set to an appropriate value in accordance with the predicted line speed.

[Effects]

In the driving support system 100, in response to a line speed information transmission request from the on-vehicle device 120 of the first vehicle 108, the server 102 can transmit, to the on-vehicle device 120, line speed information in an expected traveling area thereof. The on-vehicle device 120 can acquire information about the line speed of the communication line in the expected traveling area for the first vehicle 108, at an appropriate timing, and using the received line speed information, the on-vehicle device 120 can predict the line speed and determine appropriate parameters, shortly before the line speed actually changes. Thus, the on-vehicle device 120 can execute processing appropriately and immediately adapted to change in the line speed. That is, the on-vehicle device 120 can perform appropriate processing at the initial stage of collecting sensor information to be transmitted, so that processing at the subsequent stage will not be inefficient. In addition, the on-vehicle device 120 can appropriately determine the size of the buffer, and thus can prevent overflow of the buffer or such inefficiency that a buffer larger than necessary is prepared.

Further, the on-vehicle device 120 can perform data transmission to the server computer efficiently and without trouble. Thus, the server 102 can efficiently acquire sensor information from the on-vehicle device 120 of the first vehicle 108, and can analyze the sensor information and provide the analysis result as driving support information to the on-vehicle device 120 of the first vehicle 108.

(Modifications)

In the above description, the case where line speed information is transmitted without discriminating the communication line between 5G line and LTE line, has been shown, but another configuration is also applicable. The server 102 can manage line speed information with discrimination between 5G line and LTE line, and therefore may transmit the line speed information of each line. That is, the server 102 can transmit line speed information of 5G line and line speed information of LTE line to a vehicle that requests line speed information. It is conceivable that there is an on-vehicle device that supports LTE line but does not support 5G line. Since the line speed can change in the same LTE line, such an on-vehicle device can also effectively utilize the received line speed information. That is, even if the vehicle is provided with an on-vehicle device that supports only a specific communication line, the predicted line speed can be appropriately determined and data transmission to the server computer can be performed efficiently and without any trouble.

In the above description, the case where the communication lines that the on-vehicle device can support are LTE and 5G, has been shown, but another configuration is also applicable. The communication lines that the on-vehicle device can support may be a plurality of lines greatly different in the specifications of line speeds. Also, the number of communication lines that the on-vehicle device can support may be one. This is because, even in a case of using the same communication line, the line speed can greatly change in accordance with the traveling environment (traveling location, traveling time, etc.) of the vehicle.

In the above description, the case where the on-vehicle device 120 of the first vehicle 108 requests line speed information to the server 102, has been shown, but another configuration is also applicable. The on-vehicle device 120 may request line speed information to an on-vehicle device of another vehicle present in a predetermined range from the first vehicle 108. In this case, the on-vehicle device of the vehicle that has received the request transmits the stored own-vehicle traveling record and line speed information in association with each other, to the on-vehicle device 120. In addition, the on-vehicle device 120 may transmit the traveling route of the first vehicle 108 and request line speed information. The on-vehicle device of the vehicle that has received this transmits the line speed information to the on-vehicle device 120, if the stored own-vehicle traveling record overlaps the received traveling route. Such a function can be implemented by an application program of the on-vehicle device. In addition, in a case of transmitting line speed information from the on-vehicle device of the second vehicle 110 to the on-vehicle device 120, the line speed information may be directly transmitted to the on-vehicle device 120 or may be transmitted via an on-vehicle device of another vehicle. Thus, the on-vehicle device 120 can acquire information about the line speed of the communication line on the traveling route of the first vehicle 108 more assuredly at an appropriate timing.

Figure 10:
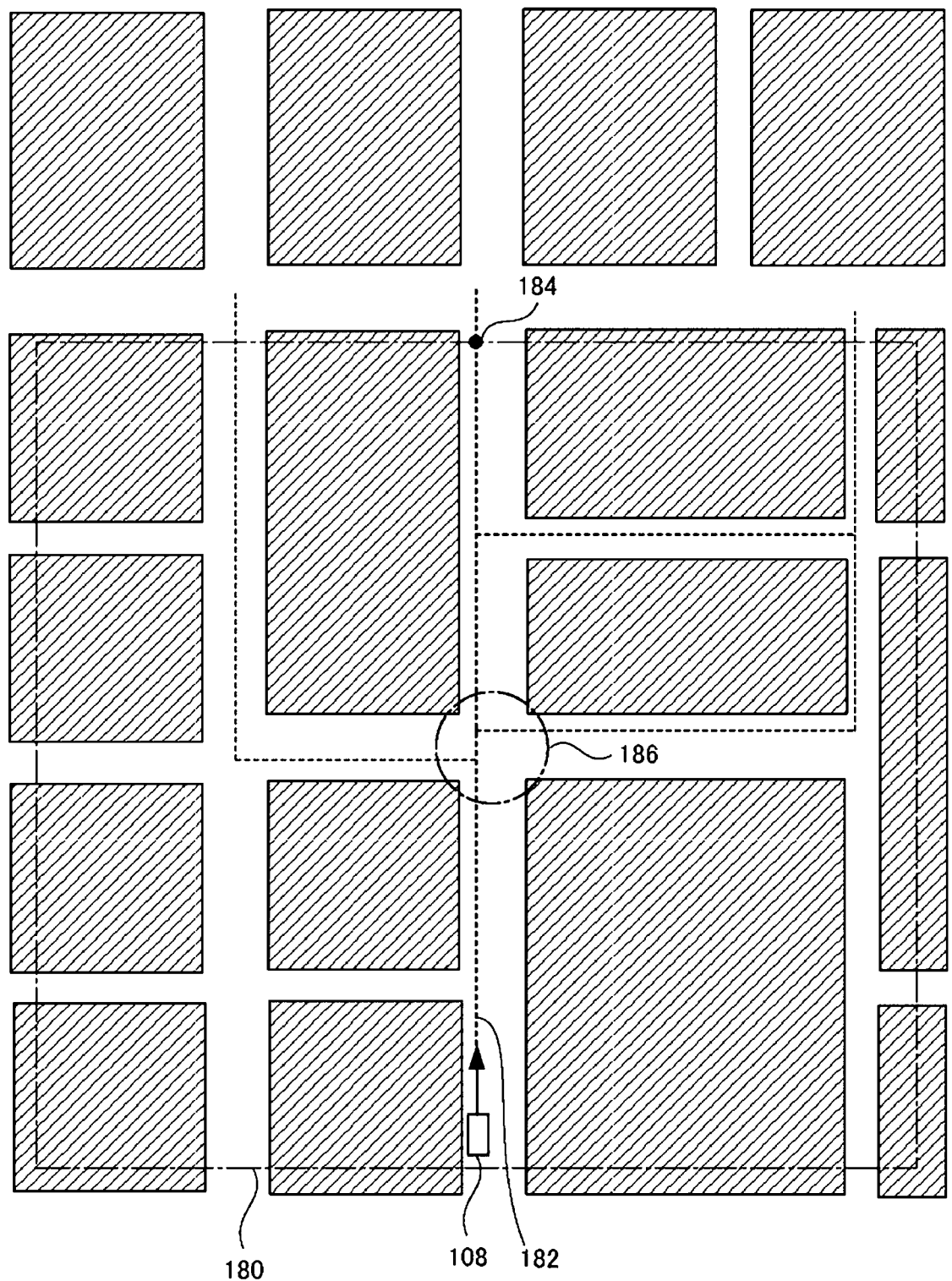
FIG. 10 is a schematic view showing a possible traveling route of a vehicle in a modification.

In the above description, the case where line speed information for the traveling route transmitted from the on-vehicle device 120 of the first vehicle 108 is transmitted from the server 102, has been shown, but another configuration is also applicable. The traveling route of the first vehicle 108 might be changed. It is conceivable that there is an intersection (road part such as crossroads, T junction, or Y junction, where a plurality of roads intersect) in the advancing direction of the first vehicle 108, so that a plurality of possible traveling routes exist. In this case, it is preferable that the server 102 having received the traveling route from the on-vehicle device 120 of the first vehicle 108 transmits, in addition to line speed information about the traveling route, line speed information about the plurality of possible traveling routes branching at the intersection. For example, in FIG. 10, roads branching at the intersection 186 and extending therefrom are possible traveling routes, and therefore the server also transmits line speed information about these possible traveling routes. The on-vehicle device 120 of the first vehicle 108 that has received the line speed information can specify a predicted line speed after the first vehicle 108 passes the intersection 186 (goes straight, turns left, or turns right). That is, after the first vehicle 108 starts to travel through one of the plurality of possible traveling routes, the on-vehicle device 120 specifies line speed information corresponding to the actual traveling route from the line speed information received from the server and stored, and can specify a predicted line speed using the specified line speed information. In this way, the on-vehicle device 120 can appropriately determine a predicted line speed even when the traveling route of the first vehicle 108 is changed.

Figure 11:
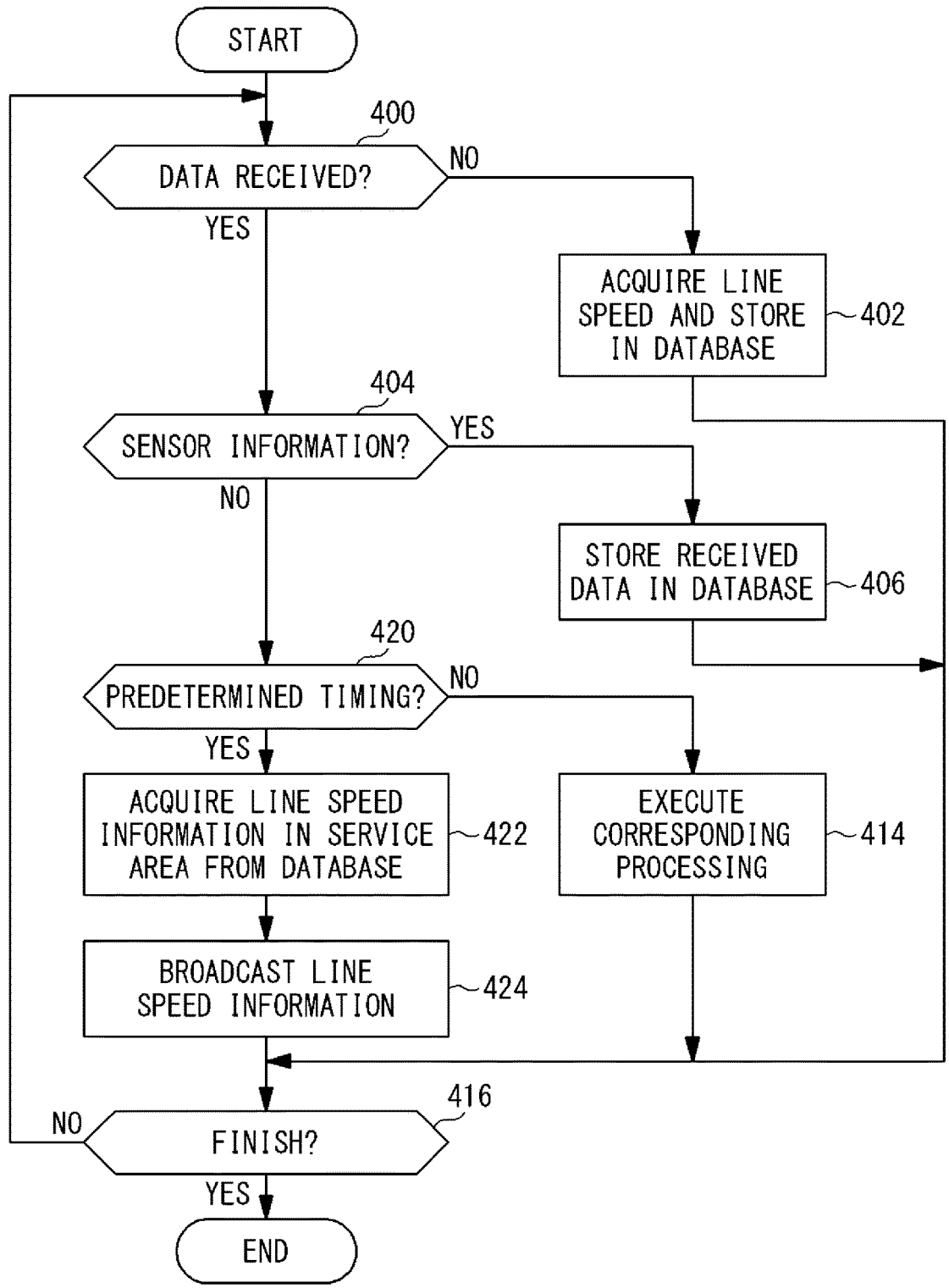
FIG. 11 is a flowchart showing operation of the server in a modification.

Even when a line speed information request is not received from the on-vehicle device 120 of the first vehicle 108, the server 102 may repeatedly broadcast line speed information in the service area at a predetermined timing. The on-vehicle device that has received the broadcasted line speed information can specify a predicted line speed for its own vehicle using the broadcasted line speed information, as described above. In this case, the server 102 may broadcast line speed information on roads where vehicles can pass, in the service area. For example, the server 102 executes a flowchart shown in FIG. 11. FIG. 11 is different from the flowchart shown in FIG. 9 only in that steps 408, 410, and 412 are respectively replaced with steps 420, 422, 424. Therefore, the same description will not be repeated and only different processing will be described.

In step 420, the control unit 140 determines whether or not a predetermined timing has come. The predetermined timing comes at predetermined constant time intervals of about several seconds to several minutes. If it is determined that the constant time has elapsed (predetermined timing has come) on the basis of the internal timer of the control unit 140, the control proceeds to step 422. Otherwise, the control proceeds to step 414. In step 422, the control unit 140 reads the stored line speed information {xi, yi, pi} about roads in the service area of the server 102, from the database of the memory 142. In step 424, the control unit 140 transmits the line speed information read in step 422, by broadcasting.

Figure 12:
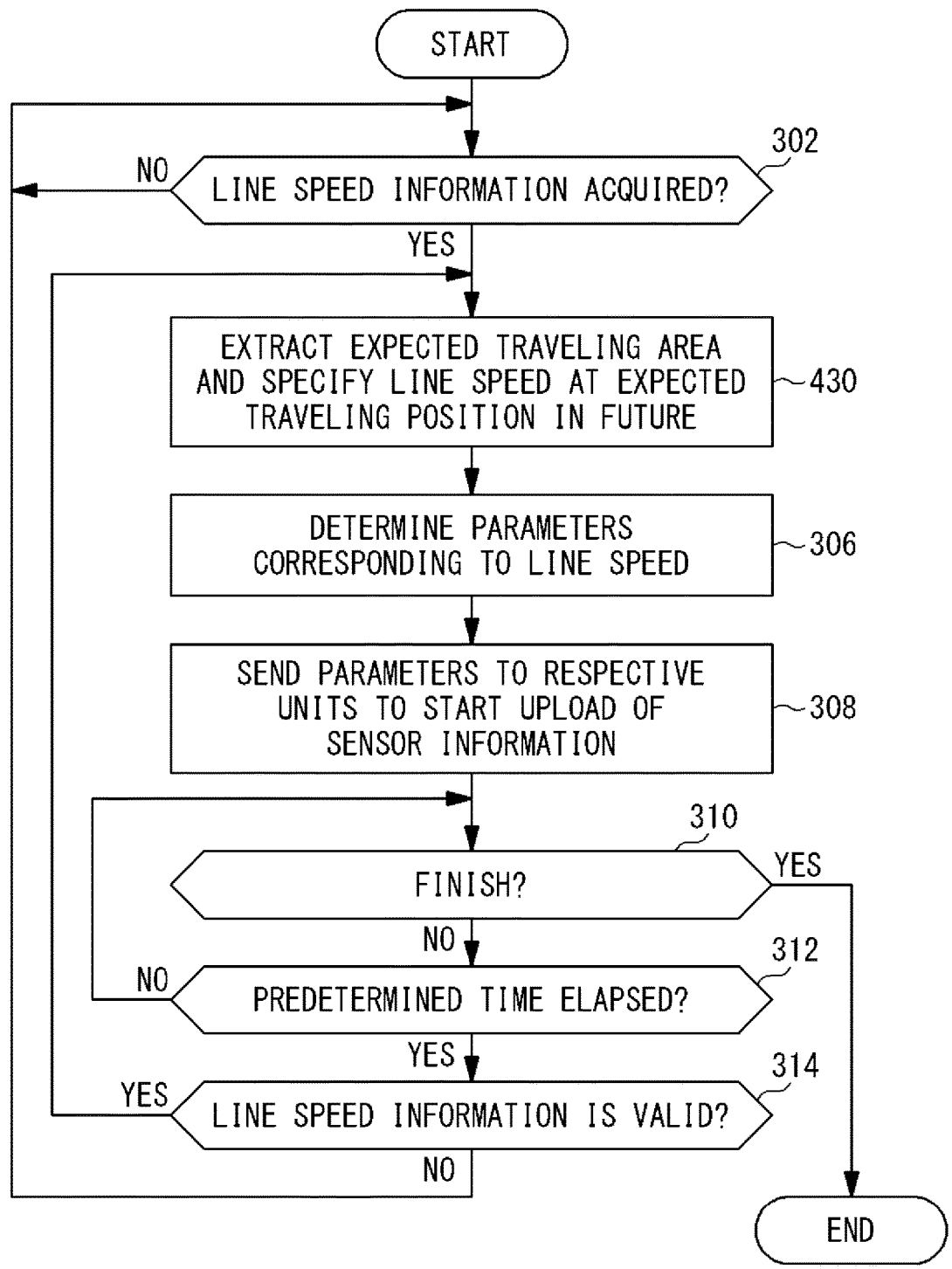
FIG. 12 is a flowchart showing operation of the on-vehicle device in a modification.

On the other hand, the on-vehicle device 120 of the first vehicle 108 executes a flowchart shown in FIG. 12. FIG. 12 is different from the flowchart shown in FIG. 8 only in that step 300 is deleted and step 304 is replaced with step 430. Therefore, the same description will not be repeated and only different processing will be described. Here, the control unit 130 does not transmit a line speed information request. In step 430, the control unit 130 extracts line speed information about the expected traveling area for the first vehicle 108, from the line speed information received in step 302 (line speed information transmitted from the server 102 in step 412 in FIG. 9). Subsequently, the control unit 130 specifies a predicted line speed using the extracted line speed information, as described above. Thus, even when the traveling route of the first vehicle 108 has changed, the on-vehicle device 120 can, without acquiring new line speed information from outside, predict the line speed and determine appropriate parameters, shortly before the line speed actually changes. Therefore, the on-vehicle device 120 can execute processing appropriately and immediately adapted to change in the line speed.

Figure 13:
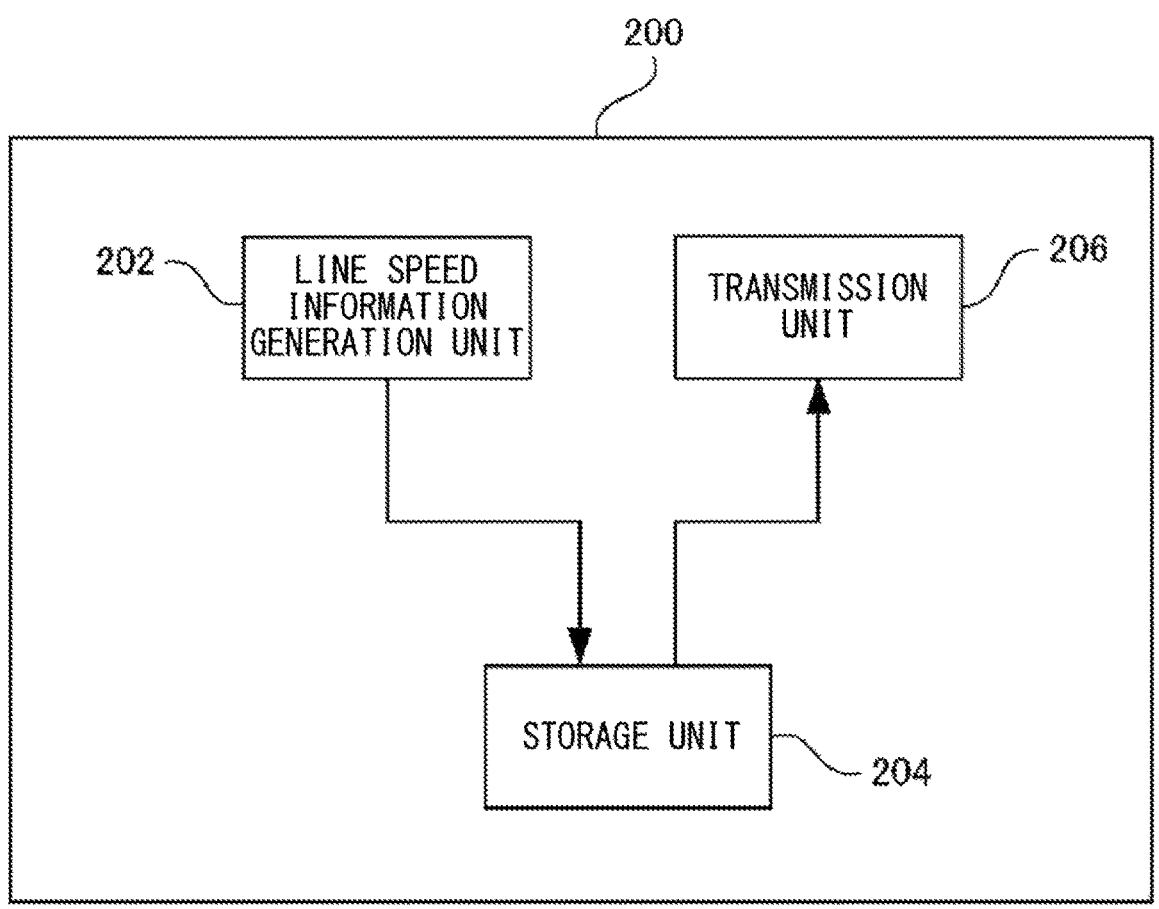
FIG. 13 is a block diagram showing the configuration of the on-vehicle device in a modification.

Instead of or in addition to the server 102 broadcasting line speed information, the on-vehicle device of each vehicle may transmit line speed information. For example, with reference to FIG. 13, the on-vehicle device 200 of each vehicle may include a line speed information generation unit 202 for generating line speed information including position coordinates on a route through which its own vehicle has traveled, and the line speed at the position, a storage unit 204 for storing the generated line speed information, and a transmission unit 206 for reading the line speed information from the storage unit 204 and transmitting (e.g., broadcasting) the same, at a predetermined timing. For example, the on-vehicle device 120 of the first vehicle 108 may receive the line speed information broadcasted from the on-vehicle device of the second vehicle 110. Thus, if the second vehicle 110 is traveling in the expected traveling area for the first vehicle 108, the on-vehicle device 120 can more assuredly acquire information about the line speed of the communication line in the expected traveling area for the first vehicle 108. If the second vehicle 110 is traveling in front of the first vehicle 108, the on-vehicle device 120 can acquire more reliable information about the line speed of the communication line on the traveling route of the first vehicle 108.

In the above description, the case where the server 102 transmits data in a predetermined size with a predetermined command to vehicles and sensor devices provided on roads and the like, calculates line speeds, and stores the line speeds as a database, has been shown (see step 402 in FIG. 9). However, a method for the server 102 to generate the database of line speed information is not limited thereto. Each of vehicles and sensor devices provided on roads may measure the communication line speed, and transmit the communication line speed in association with position information, to the server 102. The server 102 can collect these and thereby construct a line speed information database.

While the present invention has been described through description of embodiments above, the above embodiments are merely illustrative and the present invention is not limited to only the above embodiments. The scope of the present invention is defined by each claim of the scope of claims with reference to the above description, and includes meanings equivalent to the wordings described therein and all modifications within the scope of claims.

REFERENCE SIGNS LIST

- 100 driving support system
- 102 server
- 104 first base station
- 106 second base station
- 108 first vehicle
- 110 second vehicle
- 120, 200 on-vehicle device
- 122 sensor device
- 124 A/D conversion unit
- 126, 144 communication unit
- 128, 142 memory
- 130, 140 control unit
- 132, 146 bus
- 160 sensor information collecting unit
- 162 preferential control unit
- 164 packet transmission unit
- 166 multilevel control unit
- 168 packet reception unit
- 170 line management unit
- 180 predetermined range
- 182 traveling route
- 184 boundary point
- 186 intersection
- 202 line speed information generation unit
- 204 storage unit
- 206 transmission unit
- 300, 302, 304, 306, 308, 310, 312, 314, 400, 402, 404, 406, 408, 410, 412, 414, 416, 420, 424, 430 step

The invention claimed is:

1. A system comprising a server computer and a first on-vehicle device of a first vehicle which communicates with the server computer via a communication line, wherein
the first on-vehicle device includes a microcomputer programmed to:
collect sensor information detected by a sensor provided to the first vehicle,
transmit the sensor information to the server computer via the communication line,
receive first data including a line speed of the communication line in an expected traveling area of the first vehicle, from outside of the first vehicle,
determine, as a predicted line speed, the line speed of the communication line at an expected traveling position of the first vehicle in a future, on the basis of the first data that is received, and
determine a parameter relevant to transmission of the sensor information to the server computer, on the basis of the predicted line speed.

2. The system according to claim 1, further comprising a second on-vehicle device of a second vehicle, wherein
the second on-vehicle device includes a second microcomputer programmed to:
generate second data including information about a traveling position of the second vehicle and the line speed of the communication line at the traveling position, and
transmit the second data to at least one of the first on-vehicle device and the server computer via the communication line.

3. The system according to claim 2, wherein
the second vehicle is traveling in the expected traveling area of the first vehicle.

4. The system according to claim 2, wherein
the server computer receives the second data transmitted from the second on-vehicle device, generates the first data from the received second data, and transmits the first data to the first on-vehicle device.

5. The system according to claim 1, wherein
the first on-vehicle device transmits traveling route information indicating a traveling route of the first vehicle, to the server computer, and
the server computer transmits the first data including a position on a road specified by the received traveling route information and the line speed of the communication line corresponding to the position, to the first on-vehicle device.

6. The system according to claim 2, wherein
the microcomputer of the first on-vehicle device further transmits traveling route information indicating a traveling route of the first vehicle, to the second on-vehicle device, and
the second microcomputer of the second on-vehicle device further transmits the second data including a position on a road specified by the received traveling route information and the line speed of the communication line corresponding to the position, to the first on-vehicle device.

7. The system according to claim 1, wherein
the server computer transmits third data including a position on a road and the line speed of the communication line corresponding to the position, to the first on-vehicle device,
the microcomputer further receives the third data, and
the microcomputer extracts the line speed corresponding to a position in the expected traveling area, from the third data that is received, and using the extracted line speed as the first data, determines the predicted line speed.

8. The system according to claim 2, wherein
the second data is received by the first on-vehicle device via an on-vehicle device of a third vehicle.

9. The system according to claim 1, wherein
the parameter includes a transmission speed of data including the sensor information to be transmitted from the microcomputer.

10. The system according to claim 1, wherein
the first on-vehicle device further includes a buffer unit configured to, after storing the sensor information, output the sensor information, and
the parameter includes a parameter indicating a size of the buffer unit.

11. The system according to claim 1, wherein
the parameter includes a parameter indicating a speed for collecting the sensor information detected by the sensor.

12. The system according to claim 1, wherein
the microcomputer includes a table in which a plurality of line speed ranges and a plurality of values of the parameter are one-to-one associated, and
refers to the table for the predicted line speed, to determine the value of the parameter corresponding to the predicted line speed.

13. The system according to claim 1, wherein
when there are a plurality of possible traveling routes in an advancing direction of the first vehicle, the server computer transmits the first data about the plurality of respective possible traveling routes, to the first on-vehicle device, and
after the first vehicle starts to travel through one of the plurality of possible traveling routes, the microcomputer determines the predicted line speed, using the first data about the possible traveling route including a position where the first vehicle is traveling.

14. The system according to claim 1, wherein
the microcomputer determines the expected traveling position of the first vehicle in the future on the basis of at least one of a speed of the first vehicle, an acceleration of the first vehicle, and a traffic condition around the first vehicle, and determines the predicted line speed corresponding to the expected traveling position.

15. The system according to claim 1, wherein
the microcomputer receives the first data about a plurality of respective communication lines, and
determines the predicted line speed on the basis of the first data corresponding to the communication line being used by the microcomputer for communication with the server computer.

16. An on-vehicle device comprising a microcomputer programmed to:
collect sensor information detected by a sensor provided to a vehicle;
transmit the sensor information to a server computer via a communication line;
receive data including a line speed of the communication line in an expected traveling area of the vehicle, from outside of the vehicle;
determine, as a predicted line speed, the line speed of the communication line at an expected traveling position of the vehicle in a future, on the basis of the data that is received; and
determine a parameter relevant to transmission of the collected sensor information to the server computer, on the basis of the predicted line speed.

17. A control method for controlling an on-vehicle device mounted on a vehicle, the control method comprising:
collecting sensor information detected by a sensor provided to the vehicle;
transmitting the sensor information to a server computer via a communication line;
receiving data including a line speed of the communication line in an expected traveling area of the vehicle, from outside of the vehicle;
determining, as a predicted line speed, the line speed of the communication line at an expected traveling position of the vehicle in a future, on the basis of the data that is received; and
determining a parameter relevant to transmission of the collected sensor information to the server computer, on the basis of the predicted line speed.

18. A non-transitory computer readable storage medium storing a computer program for causing a computer mounted on a vehicle to implement steps comprising:
collecting sensor information detected by a sensor provided to the vehicle;
transmitting the sensor information to a server computer via a communication line;
receiving data including a line speed of the communication line in an expected traveling area of the vehicle, from outside of the vehicle;
determining, as a predicted line speed, the line speed of the communication line at an expected traveling position of the vehicle in a future, on the basis of the data that is received; and
determining a parameter relevant to transmission of the collected sensor information to the server computer, on the basis of the predicted line speed.

19. The system according to claim 1, wherein the microcomputer comprises an A/D converter, a memory, a processor, and an antenna.

20. The on-vehicle device according to claim 16, wherein the microcomputer comprises an A/D converter, a memory, a processor, and an antenna.

* * * * *